(12) United States Patent
Lee et al.

(10) Patent No.: US 11,641,451 B2
(45) Date of Patent: May 2, 2023

(54) VIRTUAL RECEPTIONIST VIA VIDEOCONFERENCING

(71) Applicant: Zoom Video Communications, Inc., San Jose, CA (US)

(72) Inventors: Cynthia Lee, Sunnyvale, CA (US); Stephen Newton, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/245,536

(22) Filed: Apr. 30, 2021

(65) Prior Publication Data

US 2022/0353472 A1 Nov. 3, 2022

(51) Int. Cl.
*H04N 7/15* (2006.01)
*H04L 12/18* (2006.01)

(52) U.S. Cl.
CPC ......... *H04N 7/157* (2013.01); *H04L 12/1818* (2013.01); *H04L 12/1822* (2013.01)

(58) Field of Classification Search
CPC ........ H04N 1/00299; H04N 1/42; H04N 7/14; H04N 7/141; H04N 2007/145; H04N 7/142; H04N 7/15; H04N 7/155
USPC ...................... 348/14.01, 14.02, 14.08–14.9
See application file for complete search history.

(56) References Cited

U.S. PATENT DOCUMENTS

| 9,818,244 | B2 | 11/2017 | Elfström et al. |
| 2015/0370318 | A1* | 12/2015 | Yamaguchi ........... G06F 3/0482 345/157 |
| 2016/0088155 | A1* | 3/2016 | Patel ................... H04L 61/4557 379/265.09 |
| 2016/0119477 | A1* | 4/2016 | Sharpe ............... G06Q 30/0261 379/265.09 |
| 2017/0004546 | A1* | 1/2017 | Wong .................... H04L 67/025 |
| 2019/0103100 | A1* | 4/2019 | Rozen ..................... G10L 15/30 |
| 2019/0215284 | A1 | 7/2019 | Tiernan |

* cited by examiner

*Primary Examiner* — Maria El-Zoobi
(74) *Attorney, Agent, or Firm* — Kilpatrick Townsend & Stockton LLP

(57) ABSTRACT

One disclosed example system includes a reception room meeting device configured for establishing a video conference with a device associated with a remote receptionist. The reception room meeting device sends a request for a video meeting with one of a plurality of candidate remote receptionists in response to receiving an activation signal triggered by a visitor to a reception area, and establishes the video meeting with a device associated with one remote receptionist selected based on the request. The system further includes a virtual receptionist system configured to access visitor data obtained by various input devices at the reception area, and determine the status of the visitor based on the visitor data. The virtual receptionist system further transmits the status of the visitor to the device associated with the selected remote receptionist to facilitate the check-in process.

20 Claims, 7 Drawing Sheets

VIRTUAL RECEPTIONIST VIA VIDEOCONFERENCING

FIELD

The present application generally relates to technologies for enabling virtual receptionist and more particularly relates to systems and methods for enabling virtual receptionist through videoconferencing.

BACKGROUND

Videoconferencing has become a common way for people to meet without being at the same physical location. Participants can join a video conference from various devices, such as a dedicated video conference device, a personal computer, a smartphone, and so on. Through the video conference, participants are able to see and hear each other and converse largely as they would during an in-person meeting or event.

SUMMARY

Various examples are described for systems and methods for enabling virtual receptionist through videoconferencing. One example method includes receiving, by a video conference provider from a reception room meeting device, a request for a meeting with a remote receptionist; determining, by the video conference provider and based on request data associated with the request, one or more qualified remote receptionists from a plurality of candidate remote receptionists, wherein the request data specifies the plurality of candidate remote receptionists and comprises an indication of a preference setting for the meeting; sending, by the video conference provider, a meeting request to a device associated with a first qualified remote receptionist that is available for the meeting; and establishing, by the video conference provider and in response to the qualified remote receptionist accepting the meeting request, a video conference between the reception room meeting device and the device associated with the first qualified remote receptionist.

In another example, a system includes a reception room meeting device configured for establishing a video conference with a device associated with a remote receptionist by sending, to a video conference provider, a meeting request for a video meeting with one of a plurality of candidate remote receptionists in response to receiving an activation signal triggered by a visitor; and establishing the video meeting with a device associated with a remote receptionist available to assist the visitor out of the plurality of candidate remote receptionists selected by the video conference provider based on the meeting request. The system further includes one or more input devices configured for obtaining data associated with the visitor; and one or more computing devices comprising one or more processors and non-transitory computer-readable media communicatively coupled to the one or more processors and storing processor-executable instructions that, when executed by the one or more processors, cause the one or more processors to perform operations. The operations include accessing the data associated with the visitor obtained by the one or more input devices; determining a status of the visitor based on the data associated with the visitor, the status of the visitor comprising an authenticity status or a physical status; and transmitting the status of the visitor to the device associated with the available remote receptionist.

Another example system includes a reception room meeting device configured for establishing a video conference with a device associated with a remote receptionist by sending a request for a video meeting with one of a plurality of candidate remote receptionists in response to receiving an activation signal triggered by a visitor, and establishing the video meeting with a device associated with a remote receptionist of the plurality of candidate remote receptionists selected based on the request. The system further includes one or more computing devices comprising one or more processors and non-transitory computer-readable media communicatively coupled to the one or more processors and storing processor-executable instructions that, when executed by the one or more processors, cause the one or more processors to perform operations. The operations comprise receiving, from the reception room meeting device among a plurality of reception room meeting devices, the request for the video meeting; determining, based on request data associated with the request, a qualified remote receptionist from the plurality of candidate remote receptionists, wherein the request data specifies the plurality of candidate remote receptionists; and causing a video meeting between the reception room meeting device and a device associated with the qualified remote receptionist to be initiated by sending, to a video conference provider, a meeting request for the video meeting.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of certain examples.

DETAILED DESCRIPTION

Figure 1:
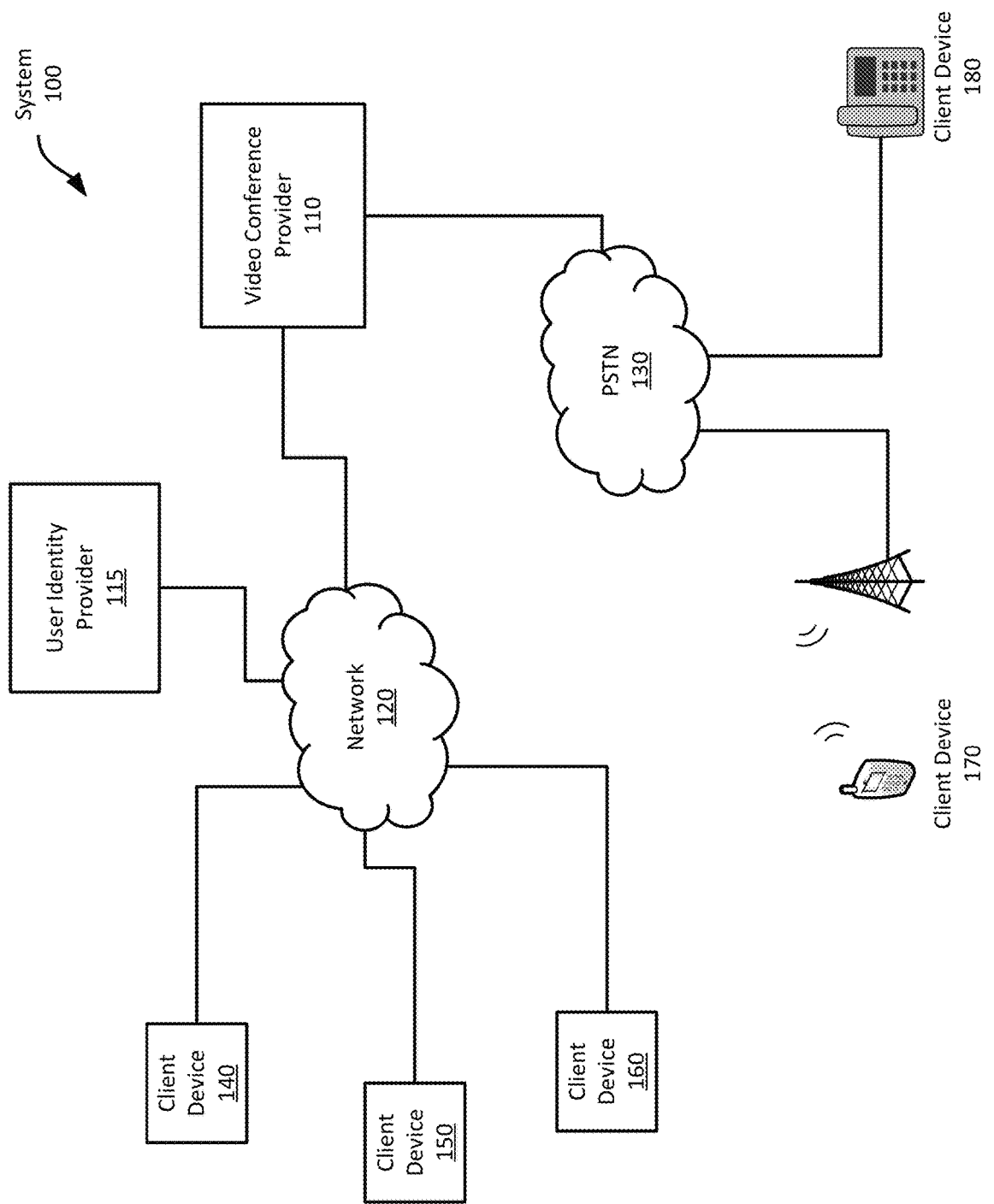
FIG. 1 shows an example system that provides videoconferencing functionality to various client devices, according to certain aspects described herein.

Examples are described herein in the context of systems and methods for enabling virtual receptionists through videoconferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In one example, a virtual reception system includes a reception room meeting device located in a reception area. The reception room meeting device is configured for establishing a video conference with a device associated with a virtual receptionist who is located remotely from the reception area (also referred to herein as a "remote receptionist"). For instance, the reception room meeting device sends, in response to receiving an activation signal, a meeting request for a video meeting with a virtual receptionist. The activation signal may be generated by, for example, a visitor touching a call button on the reception room meeting device, standing in front of a camera associated with the reception room meeting device, or scanning his/her identification card using an ID scanner in the reception area. The reception room meeting device further establishes the video meeting with a device associated with a remote receptionist available to assist the visitor. The remote receptionist is selected out of a list of candidate remote receptionists.

The meeting request may be processed by a video conference provider or a virtual receptionist system to determine a qualified remote receptionist that is available to assist the visitor. The meeting request is associated with request data specifying the list of candidate remote receptionists. The request data further includes an indication of a preference setting for the meeting, such as a preferred language for the meeting. The video conference provider or the virtual receptionist system determines the qualified remote receptionist from the list of candidate remote receptionists based on the preference setting for the meeting, and facilitates the establishment of the video meeting between the reception room meeting device and the device associated with the determined remote receptionist. Once the meeting is established, the visitor is able to communicate with the remote receptionist through the video conference.

The virtual reception system further includes one or more input devices configured for obtaining data associated with the visitor. The input devices may include a scanner (e.g., to scan the visitor's ID), a chip reader (e.g., to read the visitor's information through reading a chip on a device carried by the visitor), a temperature sensor (to measure the body temperature of the visitor), or an image sensor (e.g., to detect the face of the visitor). The data associated with the visitor is collected, for example by the virtual receptionist system, to determine the status of the visitor, including an authenticity status or a physical status. The status of the visitor is transmitted to the device associated with the determined remote receptionist to facilitate the check-in process by the remote receptionist.

The virtual reception system further includes one or more output devices controllable by the device associate with the remote receptionist. These output devices are configured for presenting information to the visitor (e.g., a display device for presenting a map) or generating documents for the visitor (e.g., a badge printer, a parking ticket printer, or a general printer). The remote receptionist can instruct the output devices, either directly or through the virtual receptionist system, to present information or produce documents as needed.

By using the virtual receptionist technique presented herein, the overall efficiency of the reception system can be improved. For example, by enabling various systems (e.g., the video conference provider, the virtual receptionist system, the receptionist device, the reception room meeting device, and various input and output devices in the reception area) to communicate with each other to exchange information and data, the virtual receptionist technique presented herein allows a smaller number of virtual receptionists to support a larger number of reception areas. In addition, a virtual receptionist that is more suitable for a particular visitor (e.g., speaks the same language as the visitor) can be selected to handle the check-in process of the visitor. Further, by allowing the list of candidate virtual receptionists to be configured for a reception room meeting device, the virtual receptionist who handles the visitors to the reception area is limited to this known list thereby ensuring a proper virtual receptionist is selected when assisting the visitors to this reception area.

This illustrative example is given to introduce the reader to the general subject matter discussed herein and the disclosure is not limited to this example. The following sections describe various additional non-limiting examples and examples of systems and methods for securely recording and retrieving encrypted video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
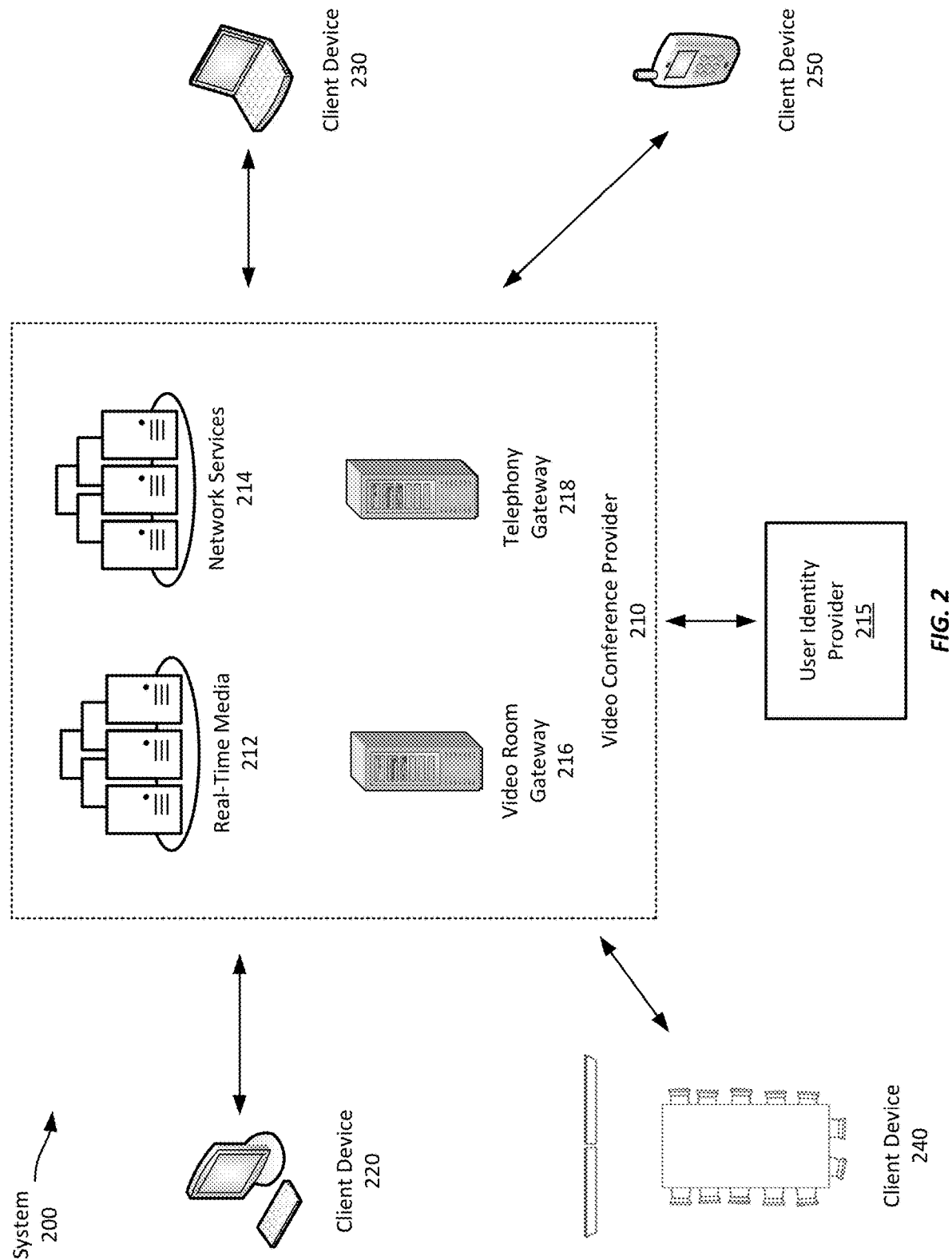
FIG. 2 shows an example system in which a video conference provider provides videoconferencing functionality to various client devices, according to certain aspects described herein.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider 210, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
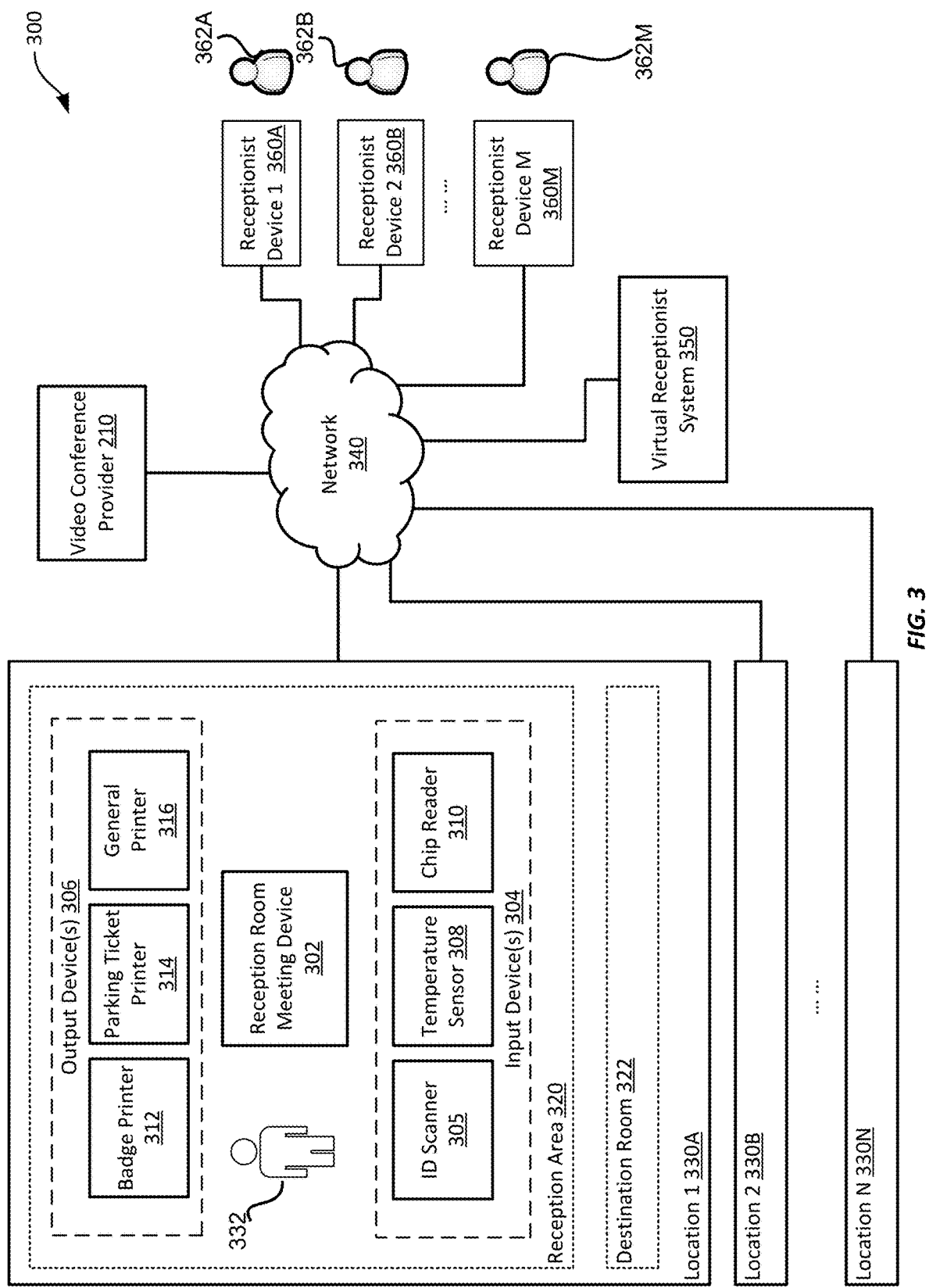
FIG. 3 shows an example of an operating environment for virtual receptionists through videoconferencing, according to certain aspects described herein.

Referring now to FIG. 3, FIG. 3 shows an example of an operating environment 300 for virtual receptionist through videoconferencing, according to certain aspects described herein. The operating environment 300 includes local systems located at various locations 330A-330N, and receptionist devices 360A-360M associated with respective remote receptionists 362A-362M configured to support the check-in process of visitors at the locations 330A-330N. The various locations 330A-330N may be referred to herein individually as a location 330 or collectively as the locations 330. Likewise, the receptionist devices 360A-360M may be referred to herein individually as a receptionist device 360 or collectively as the receptionist devices 360. The remote receptionists 362A-362M may be referred to herein individually as a remote receptionist 362 or collectively as remote receptionists 362. In some implementations, the number of remote receptionists 362 is smaller than the number of locations 330.

The operating environment 300 further includes a video conference provider 210 configured to provide video conference functionalities for reception room meeting devices 302 located at reception areas 320 of the locations 330 and the receptionist devices 360. The operating environment 300 further includes a virtual receptionist system 350 configured to facilitate the check-in process performed by the remote receptionists 362, such as collecting data associated with a visitor for the remote receptionists 362 and transmitting data to devices in the reception area 320 according to the commands sent from the receptionist devices 360. The virtual receptionist system 350 may be a system accessible over a network 340 (e.g., a cloud computing system) or a system local to the respective locations 330. The network 340 might be a local-area network ("LAN"), a wide-area network ("WAN"), the Internet, or any type of data communications network known in the art that enables communications between the various components in the operating environment 300.

At each location 330A, such as an office building or a hotel, a reception room meeting device 302, one or more input device(s) 304, and one or more output device(s) 306 may be installed in a reception area 320. The reception room meeting device 302 is configured to establish a video call with a receptionist device 360 associated with a remote receptionist 362. The one or more input device(s) 304 are configured to obtain data associated with visitors to the reception area 320. The input devices may include an identification (ID) scanner 305 (e.g., to scan the visitor's ID), a chip reader 310 (e.g., to read the visitor's information through reading a chip on a device carried by the visitor), a temperature sensor 308 (to measure the body temperature of the visitor), or a camera/image sensor (e.g., to detect the face of the visitor). The camera/image sensor may be integrated into the reception room meeting device 302 or a stand-alone camera connected to the reception room meeting device 302. The one or more output device(s) 306 are configured for presenting information to the visitor (e.g., a display device for presenting a map) or generating documents for the visitor (e.g., a badge printer, a parking ticket printer, or a general-purpose printer). The display device may be a stand-alone display device or integrated into the reception room meeting device 302. The reception room meeting device 302, the input device(s) 304, and output device(s) 306 may be communicatively connected to each other and to other systems, such as the virtual receptionist system 350, the video conference provider 210, and the receptionist devices 360.

A visitor 332 to the reception area 320 may trigger an activation signal at the reception room meeting device 302 to start a video conference with a remote receptionist 362. The activation signal for a video call may be triggered in various ways. For example, the visitor 332 may trigger the call by pressing a button on the reception room meeting device 302 (e.g., pushing a "call" button displayed on the reception room meeting device 302 or a physical button dedicated to initiating a video call with a remote receptionist). In response to receiving the user input, the reception room meeting device 302 generates an activation signal for the call. The visitor 332 may also trigger the call by standing in front of the camera/image sensor that is integrated into or otherwise connected to the reception room meeting device 302. The reception room meeting device 302 may be configured to detect a human based on the images captured by the camera and generate an activation signal for the call. In a further example, the visitor 332 may trigger the call by scanning his/her ID card using the ID scanner 305 or placing his/her cellphone or other personal device near the chip reader for reading of the information. Upon detecting that an ID card is scanned at the ID scanner 305, the reception room meeting device 302 may generate an activation signal for the call. Various other ways of triggering the video call with a remote receptionist 362 may be implemented.

Based on the activation signal, the reception room meeting device 302 can generate a meeting request for a video meeting with a remote receptionist 362. In some examples, the reception room meeting device 302 is configured with a list of candidate remote receptionists from which a remote receptionist can be selected to assist a visitor 332 at the reception area 320 where the reception room meeting device 302 is located. The list of candidate remote receptionists may be specified by an administrator in a portal user interface configured to customize the reception room meeting device 302. For instance, the reception room meeting device 302 is configured with a software template for setting up the video meeting with a remote receptionist. The template allows an administrator to enter the list of candidate remote receptionists to call and also to set up the way to initiate the call, such as dialing into a meeting or dial straight to the receptionist device 360 of a selected remote receptionist. In some examples, the template also allows the administrator to customize the user interface of the reception room meeting device 302, such as setting up a welcome screen with a call button.

The reception room meeting device 302 can also be configured to determine a preference setting for the meeting. For instance, the reception room meeting device 302 accesses or otherwise receives audio data sampled by a microphone of the reception room meeting device 302 to detect the language used by the visitor 332 as the preferred language of the meeting. The preferred language may also be input by the visitor 332, such as through selecting a menu option on a user interface presented on the reception room meeting device 302. The input of the preferred language may also be performed through a voice command where the reception room meeting device 302 analyzes the audio data captured by the microphone to detect the voice command. The reception room meeting device 302 can also be configured to generate preference settings based on other characteristics of the visitor 332, such as hearing impairment or visual impairment of the user, obtained through user interaction with the reception room meeting device 302, for example.

The reception room meeting device 302 can generate the meeting request to include the list of candidate remote receptionists, the preference setting, and other information. In one example, the reception room meeting device 302 sends the meeting request to the video conference provider 210. The video conference provider 210 selects, among the list of candidate remote receptionists, a remote receptionist based on the preference setting and the availabilities of the remote receptionists 362. For example, the video conference provider 210 determines, from the list of candidate remote receptionists, qualified remote receptionists as those matching the preference settings. If the preference settings include a preferred language for the meeting, the video conference provider 210 determines those candidate remote receptionists who speak the preferred language as the qualified remote receptionists. If the preference setting includes an indication that the meeting is to be set up for a visitor having a hearing impairment, the video conference provider 210 determines those candidate remote receptionists who know sign language as qualified remote receptionists. The video conference provider 210 further checks the availabilities of the qualified remote receptionists and selects a qualified remote receptionist who is available to assist the visitor 332.

The video conference provider 210 can further send a meeting request to the receptionist device 360 associated with the selected remote receptionist. Upon acceptance of the request, the video conference provider 210 can establish and support the video meeting between the reception room meeting device 302 and the receptionist device 360 as described above with respect to FIGS. 1 and 2.

In another example, the reception room meeting device 302 is configured to send the meeting request to the virtual receptionist system 350. Responsive to the meeting request, the virtual receptionist system 350 selects the remote receptionist based on the list of candidate remote receptionists and the preference settings in a way similar to that used by the video conference provider 210 described above. The virtual receptionist system 350 sends data identifying the selected remote receptionist to the video conference provider 210 which in turn establishes a video meeting between the reception room meeting device 302 and the receptionist device 360 as described above with respect to FIGS. 1 and 2.

To facilitate the check-in process of the visitor 332, the virtual receptionist system 350 can further obtain data about the visitor 332 from the input device(s) 304. The collection of the information can be triggered when at least one of the input devices 304 is activated. For example, if the visitor 332 scanned his/her ID card using the ID scanner 305, the virtual receptionist system 350 can obtain a copy of the scanned ID card. If the visitor 332 places his/her device close to the chip reader 310 to allow the chip reader 310 to read authentication information stored on the chip of the device, the virtual receptionist system 350 can obtain a copy of the authentication information from the chip reader 310. If the temperature sensor 308 has a reading of the visitor's temperature, the virtual receptionist system 350 can obtain the temperature reading from the temperature sensor 308 as well.

In some examples, the virtual receptionist system 350 is further configured to process the obtained data associated with the visitor 332. For example, the virtual receptionist system 350 can compare the temperature reading with a temperature requirement, e.g., to check for a potential fever, to determine if the visitor 332 is allowed to enter the building. The virtual receptionist system 350 may also be configured to store or have access to records of the scheduled visits, which may include information such as the name, address, or organization of the visitor, the host of the visitor, the destination room 322 that the visitor is scheduled to visit and so on. The virtual receptionist system 350 can thus process the scanned ID card (e.g., using image processing or recognition) to determine the information shown on the ID card, such as name, identification number, organization, address, or other aspects of the visitor 332 and determine if the extracted information matches the record. The virtual receptionist system 350 may be further configured to extract a picture of the visitor 332 from the ID card if required. Likewise, the virtual receptionist system 350 may also analyze the data obtained from the chip reader to determine the basic information about the visitor 332, such as name, address, etc., and to determine whether the information matches the record. Although the above describes multiple input devices 304, not all the input devices are used to obtain data associated with the visitor 332. For example, in some scenarios, only one of the ID scanner 305 or the chip reader 310 is installed or used to obtain data.

Based on the obtained data and the analysis results, the virtual receptionist system 350 can determine the status of the visitor 332. The status can be an authenticity status indicating whether the identity of the visitor 332 is authentic or a physical status indicating whether the visitor 332 is physically suitable to enter the premises (e.g., whether the body temperature meets the requirement). The virtual receptionist system 350 can be configured to send the status of the visitor 332 to the receptionist device 360 of the selected remote receptionist. In examples where the virtual receptionist system 350 selects the remote receptionist for the visitor 332, the virtual receptionist system 350 may transmit the status information to the remote receptionist 362 before, concurrently, or after sending the meeting request to the video conference provider 210.

In examples where the video conference provider 210 selects the remote receptionist for the visitor 332, the virtual receptionist system 350 can obtain information of the selected remote receptionist from the video conference provider 210 or from the reception room meeting device 302. For instance, once the remote receptionist is selected, the video conference provider 210 transmits the information of the selected remote receptionist 362 to the virtual receptionist system 350 so that the virtual receptionist system 350 can determine the receptionist device 360 to which the status of the visitor is to be transmitted. Alternatively, or additionally, the reception room meeting device 302 can be configured to send the virtual receptionist system 350 information about the selected remote receptionist. In further examples, the virtual receptionist system 350 may be configured to transmit the status of the visitor 332 and other information upon a request from the receptionist device 360 associated with the selected remote receptionist 362. In any of the above examples, the remote receptionist 362 can view the status of the visitor 332 prior to or during the check-in process of the visitor 332 and determine whether to allow the visitor 332 to enter the premises.

If the remote receptionist 362 determines that the visitor 332 can enter the premises, the remote receptionist may use the associated receptionist device 360 to send commands to the output device(s) 306 in the reception area 320 to generate documents or provide information to the visitor 332. For example, if a visitor badge is needed, the receptionist device 360 sends a request to the badge printer 312 to print a badge for the visitor 332. If a parking ticket is needed, the receptionist device 360 sends a request to the parking ticket printer 314 to print a parking ticket for the visitor 332. If other documents are needed, the receptionist device 360 sends a request to the general printer 316 to print the documents for the visitor 332. The request from the receptionist device 360 may be sent to directly to the output device(s) 306 in the reception area 320 or to the virtual receptionist system 350 which in turn requests the corresponding output device(s) 306 to perform the required actions.

In further examples, the receptionist device 360 associated with the remote receptionist 362 can send a request to the virtual receptionist system 350 to request digital content, such as a floor map of the building, to be presented on a display device located in the reception area 320. The digital content may also be text or images showing the status of the check-in process, such as "temperature okay," "authentication verified," "host notified," etc. The display device may be a standalone display device installed in the reception area 320 or the display integrated into the reception room meeting device 302.

In some implementations, the virtual receptionist system 350 is further configured to determine the status of the destination room 322 that the visitor 332 is scheduled to visit. The virtual receptionist system 350 can access or otherwise maintain room status for conference rooms or other rooms that are open to visitors, such as the capacity of the rooms, the current number of occupants in the respective rooms, and so on. The capacity of the rooms may be dynamically determined. For instance, if there is an ongoing pandemic, the virtual receptionist system 350 reduces the capacity of the rooms so that social distancing can be maintained. The virtual receptionist system 350 can restore the normal capacity of the rooms later on when the pandemic is over. The virtual receptionist system 350 further transmits the room status to the receptionist device 360 associated with the remote receptionist 362. In situations where the destination room 322 that the visitor 332 is scheduled to visit is full, the virtual receptionist system 350 may further provide recommendations on alternative rooms that the visitor 332 may visit based on the fullness of other rooms on the same premises.

The virtual receptionist system 350 can further be configured to send a notification to a device associated with the host of the visitor 332. For example, if the visitor 332 is checked in, the receptionist device 360 can send a request to the virtual receptionist system 350 (or the virtual receptionist system 350 can determine on its own) to send a notification to a device associated with the host, such as via a text message, a phone call, an email or an instant message through an online chatting application.

Figure 4:
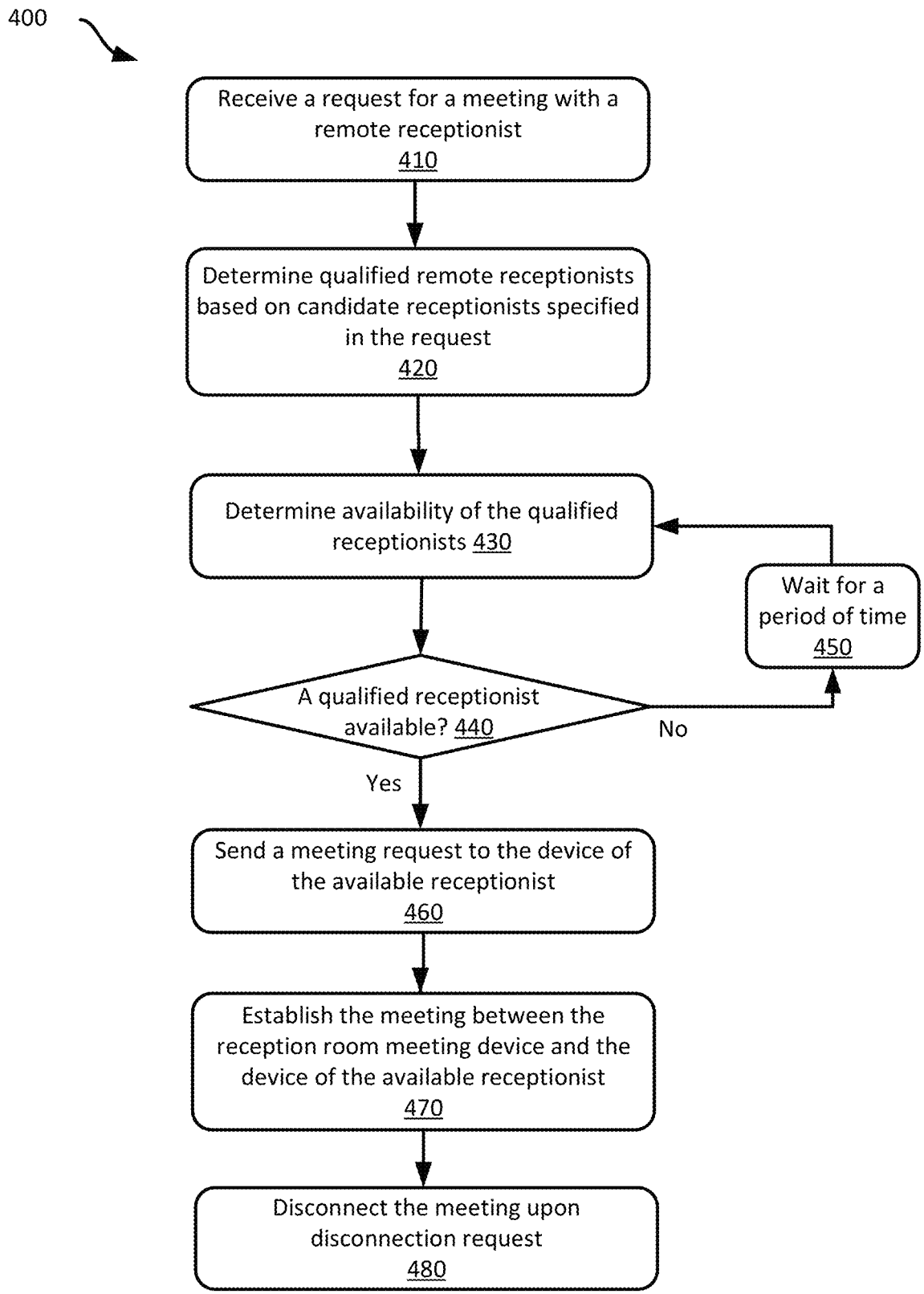
FIG. 4 shows an example of a process for establishing a video conference between a reception room meeting device and a receptionist device for a visitor, according to some aspects described herein.

Referring now to FIG. 4, FIG. 4 shows an example of a process 400 for establishing a video conference between a reception room meeting device and a receptionist device for a visitor, according to some aspects described herein. The process 400 of FIG. 4 will be described with respect to the systems shown in FIG. 3; however any suitable system according to this disclosure may be employed, including any of the systems shown in FIGS. 1 and 2. In some embodiments, one or more computing devices (e.g., the video conference provider 210) implement operations depicted in FIG. 4 by executing suitable program code.

At block 410, the video conference provider 210 receives a request for a meeting with a remote receptionist 362. In some examples, the video conference provider 210 receives the request for a meeting from a reception room meeting device 302. As discussed above with regard to FIG. 3, the request for a meeting may be generated based on an activation signal triggered in various ways. For example, a visitor 332 to the location where the reception room meeting device 302 is located may trigger the meeting by pressing a button on the reception room meeting device 302 (e.g., pushing a "call" button displayed on the reception room meeting device 302 or a physical button dedicated to initiating a video call with a remote receptionist). In response to receiving the user input, the reception room meeting device 302 generates an activation signal for the meeting. The visitor 332 may also trigger the meeting by standing in front of the camera/image sensor that is integrated in or otherwise connected to the reception room meeting device 302. The reception room meeting device 302 may be configured to detect a human based on the images captured by the camera and generate an activation signal for the meeting. The visitor 332 may also trigger the meeting by scanning his/her ID card using the ID scanner 306 or placing his/her device close to the chip reader 310. Upon detecting that an ID card is scanned at the ID scanner 305 or a chip is read by the chip reader 310, the reception room meeting device 302 may generate an activation signal for the meeting.

In some examples, the request has request data associated therewith specifying a list of candidate remote receptionists from which the remote receptionist 362 assisting the visitor 332 is to be selected. The request data may further include an indication of a preference setting for the meeting. As described above with respect to FIG. 3, the preference setting for the meeting can be determined by the reception room meeting device 302. For instance, the reception room meeting device 302 determines a preferred language for the meeting by accessing or otherwise receiving audio data to detect the language used by the visitor 332. The preferred language may also be input by the visitor 332, such as through selecting a menu option on a user interface presented on the reception room meeting device 302 or through a voice command. The reception room meeting device 302 can generate preference settings based on other characteristics of the visitor 332, such as hearing impairment or visual impairment of the user, obtained through user interaction with the reception room meeting device 302.

At block 420, the video conference provider 210 determines qualified remote receptionists based on the list of candidate remote receptionists specified in the request. If the request data of the request specifies one or more preference settings for the meeting, the video conference provider 210 further selects the qualified remote receptionists that satisfy the preference setting(s). For example, if the preference setting includes a preferred language for the meeting, the video conference provider 210 determines those candidate remote receptionists who speak the preferred language as the qualified remote receptionists. If the preference setting includes an indication that the meeting is to be set up for a visitor having a hearing impairment, the video conference provider 210 determines those candidate remote receptionists who knows sign language as qualified remote receptionists.

At block 430, the video conference provider 210 determines the availabilities of the qualified remote receptionists. In some examples, the video conference provider 210 maintains or has access to the real-time statuses of the accounts associated with the remote receptionists 362. The status for a remote receptionist may indicate that the remote receptionist is busy (e.g., in a meeting), offline, away, or available. Based on the real-time statuses of the remote receptionists, the video conference provider 210 is able to identify those qualified remote receptionists who are available to assist with the visitor 332.

At block 440, the video conference provider 210 determines if at least one qualified remote receptionist is available. If not, the video conference provider 210 waits for a period of time at block 450. The wait time may be randomly selected or pre-determined. If the video conference provider 210 determines that there is at least one qualified remote receptionist available, the video conference provider 210 sends, at block 460, a meeting request to the receptionist device 360 associated with one of the available remote receptionists 362. Upon acceptance of the meeting request by the remote receptionist 362, the video conference provider 210 establishes, at block 470, a video meeting between the reception room meeting device 302 and the receptionist device 360 associated with the remote receptionist as described above with respect to FIGS. 1 and 2. At block 480, the video conference provider 210 disconnects the meeting responsive to receiving a disconnection request from the receptionist device 360 or the reception room meeting device 302.

In the example shown in FIG. 4, the video conference provider 210 selects the remote receptionist for the visitor 332 from the list of candidate remote receptionists specified in the request. It is possible that when the request is received, none of the candidate remote receptionists is available for a long time (e.g., longer than a threshold wait time), or none of them are qualified remote receptionists according to the preference setting in the request. In such scenarios, the video conference provider 210 can search for qualified available remote receptionists outside the list of candidate remote receptionists and provide a recommendation for an alternative remote receptionist. Specifically, the video conference provider 210 estimates the time period that a remote receptionist is unavailable based on the status and statistics of the remote receptionist. For instance, the video conference provider 210 can compare the average length of meetings involving the remote receptionist 362 with the elapsed time of a meeting that the remote receptionist is currently in to determine the remaining time that the remote receptionist will be in the meeting. The remote receptionist system 350 can perform the same estimation for all the qualified remote receptionists. The virtual receptionist system 350 can send a notification to the reception room meeting device 302 with the shortest estimated wait time, where the reception room meeting device 302 is configured to display the estimated wait time to the visitor 332.

If none of the qualified remote receptionists has an estimated remaining meeting time shorter than the threshold wait time, the video conference provider 210 can provide the recommendation for an alternative remote receptionist. The video conference provider 210 may maintain, or obtain from the virtual receptionist system 350, a list of remote receptionists that are authorized to serve visitors to the location 330 but are not specified in the request. The video conference provider 210 can determine whether any of these additional remote receptionists are qualified and available to assist the visitor 332 as described above. The video conference provider 210 may present any determined remote receptionist to an administrator or other personnel in charge of managing the remote receptionists for approval. Upon receiving the approval, the video conference provider 210 can establish a video meeting between the reception room meeting device 302 and the receptionist device 360 of the recommended remote receptionist 362.

Figure 5:
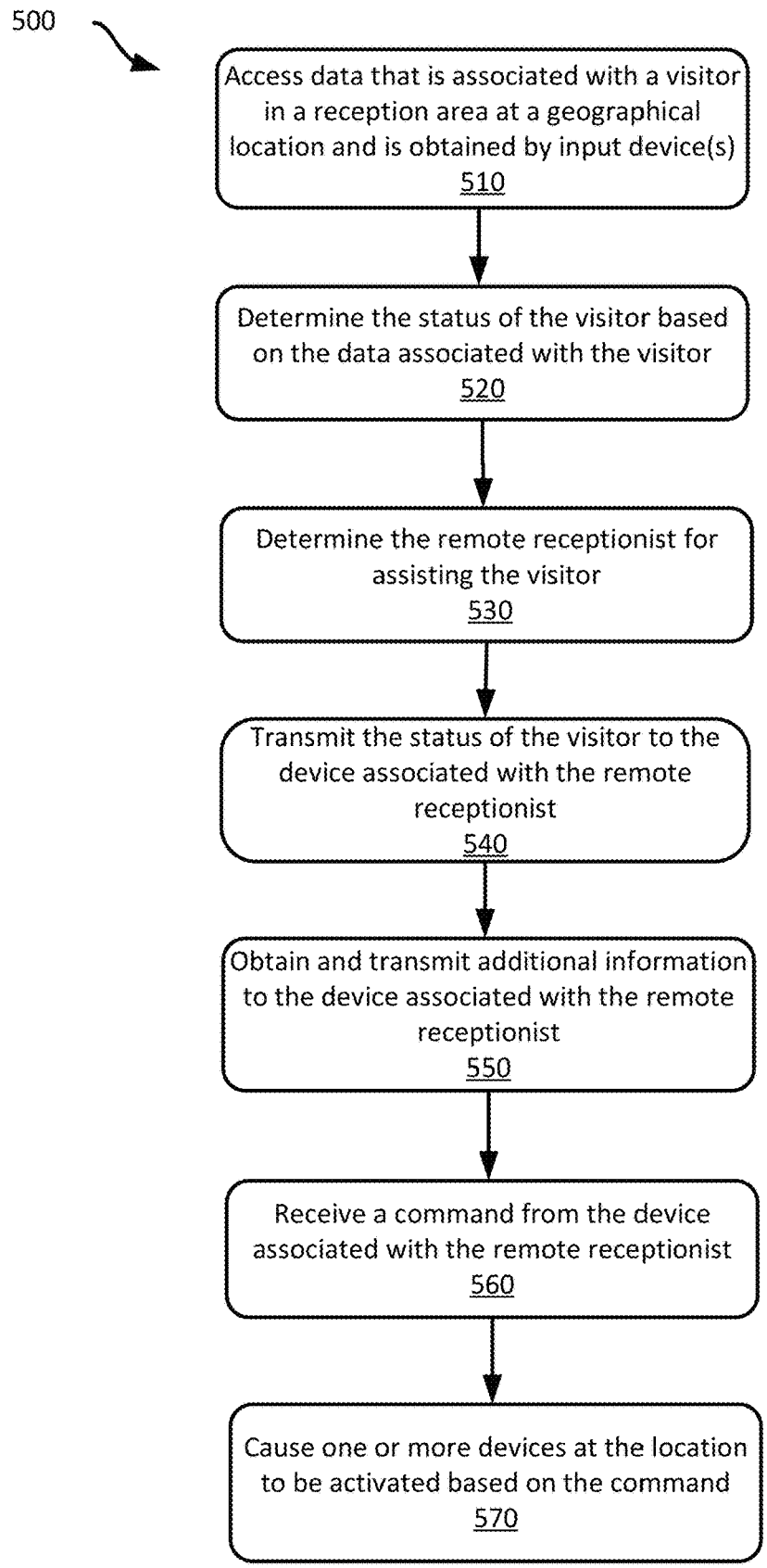
FIG. 5 shows an example of a process for facilitating the check-in process of a visitor by a virtual receptionist, according to certain aspects described herein.

Referring now to FIG. 5, FIG. 5 shows an example of a process 500 for facilitating the check-in process of a visitor by a remote receptionist, according to some aspects described herein. The process 500 of FIG. 5 will be described with respect to the systems shown in FIG. 3; however any suitable system according to this disclosure may be employed, including any of the systems shown in FIGS. 1 and 2. In some embodiments, one or more computing devices (e.g., the virtual receptionist system 350) implement operations depicted in FIG. 5 by executing suitable program code.

At block 510, the virtual receptionist system 350 accesses data associated with a visitor 332. As discussed above with respect to FIG. 3, the data can be obtained by various input devices 304 at the location of the visitor 332. As discussed above with respect to FIG. 3, collecting the data associated with the visitor 332 can be triggered when at least one of the input devices 304 is activated. For example, if the visitor 332 scanned his/her ID card using the ID scanner 305, the virtual receptionist system 350 can obtain a copy of the scanned ID card. If the visitor 332 uses the chip reader to enter his/her authentication information, the virtual receptionist system 350 can obtain a copy of the authentication information. If the temperature sensor 308 has a reading of the visitor's temperature, the virtual receptionist system 350 can obtain the temperature reading from the temperature sensor 308. The data associated with the visitor 332 can further include a picture of the visitor 332, such as a picture taken by a camera on the reception room meeting device 302 or another camera in the reception area.

At block 520, the virtual receptionist system 350 determines the status of the visitor 332 based on the data associated with the visitor. For example, the virtual receptionist system 350 compares the temperature reading with a temperature requirement to determine if the visitor 332 is well enough to be allowed to enter the building. The virtual receptionist system 350 processes the scanned ID card or the data obtained by the chip reader to determine information of the visitor 332, such as name, identification number, organization, address, and determine whether the extracted information matches the information stored in the records of the scheduled visits. The virtual receptionist system 350 may be further configured to compare (e.g., using face recognition) the picture of the visitor obtained by a camera with his/her picture on the scanned ID card. Based on the processed information, the virtual receptionist system 350 determines the status of the visitor 332. The status can be an authenticity status indicating whether the identity of the visitor 332 is authenticate or a physical status indicating whether the visitor 332 is physically suitable to enter the premises (e.g., whether the body temperature meets the requirement).

At block 530, the virtual receptionist system 350 determines the remote receptionist 362 for assisting the visitor 332. In scenarios where the reception room meeting device 302 sends the request for a meeting to the virtual receptionist system 350, the virtual receptionist system 350 can determine qualified remote receptionists 362 from the list of candidate remote receptionists in a similar way as the video conference provider 210 described above with respect to FIG. 4. To determine the availabilities of these qualified remote receptionists, the virtual receptionist system 350 can request the video conference provider 210 to send the statuses of the qualified remote receptionists or identifiers of qualified remote receptionists who are available based on their statuses. The virtual receptionist system 350 selects a remote receptionist from the available remote receptionists. The virtual receptionist system 350 further transmits a meeting request to the video conference provider 210 to start the video meeting between the reception room meeting device 302 and the receptionist device 360 associated with the selected remote receptionist 362. Similar to that described above with respect to FIG. 4, the virtual receptionist system 350 may also be configured to provide recommendation for an alternative remote receptionist if none of the qualified candidate remote receptionists is available for a long time or there are no qualified remote receptionists in the list of candidate remote receptionists.

In scenarios where the reception room meeting device 302 sends the request for a meeting to the video conference provider 210, the virtual receptionist system 350 can obtain the information about the selected remote receptionist from the video conference provider 210.

At block 540, the virtual receptionist system 350 transmits the status of the visitor 332 to the receptionist device 360 associated with the selected remote receptionist 362 to facilitate the check-in process. The transmission may be before, concurrently, or after the virtual receptionist system 350 requests the video conference provider 210 to establish the meeting. In some examples, the transmission is at the request of the receptionist device 360 of the selected remote receptionist 362.

At block 550, the virtual receptionist system 350 obtains and transmits additional information to the receptionist device 360 associated with the selected remote receptionist 362 if it receives new data about the visitor 332 from the input device(s) 304. In further examples and as discussed above with respect to FIG. 3, the virtual receptionist system 350 is configured to determine the status of the destination room 322 that the visitor 332 is scheduled to visit. The virtual receptionist system 350 compares the current capacity of the destination room 322 and the number of occupants in that room to determine whether the room is fully occupied. The virtual receptionist system 350 further transmits the room status to the receptionist device 360 associated with the remote receptionist. In situations where the room that the visitor 332 is scheduled to visit is full, the virtual receptionist system 350 may further provide recommendations on alternative rooms that the visitor 332 may visit. The visitor 332 may further collect and transmit other information to the receptionist device 360.

At block 560, the virtual receptionist system 350 receives a command from the receptionist device 360. In some examples, the command instructs one or more output device(s) 306 in the reception area 320 to be activated to generate documents or provide information to the visitor 332, as discussed above with respect to FIG. 3. The command can be a command to instruct the badge printer 312 to print a badge for the visitor 332, a command to instruct the parking ticket printer 314 to print a parking ticket for the visitor 332, a command to print the documents for the visitor 332. The command may instruct digital content, such as a floor map of the building, to be presented on a display device located in the reception area 320. The digital content may also be text or images showing the status of the process, such as "temperature okay" "authentication verified" "host notified" etc. In other examples, the virtual receptionist system 350 may also receive a command to notify the host about the arrival of the visitor 332 and the room the visitor 332 is instructed to stay in while waiting for the host.

At block 570, the virtual receptionist system 350 sends instructions to activate the corresponding output device(s) 306 or other devices based on the command received at block 560. For example, depending on the command received at block 560, the virtual receptionist system 350 may instruct the output device(s) and other devices in the reception area 320 to print the document or display the content as instructed. If the command is to notify the host, the virtual receptionist system 350 may retrieve the contact information of the host (e.g., the email address, phone number, online chat account), and send a notification in a proper format (e.g., an email, a text message, a phone call, or an instant message). Sending such a notification can activate the device of the host (e.g., a cellphone or a computer) to display the notification.

Figure 6:
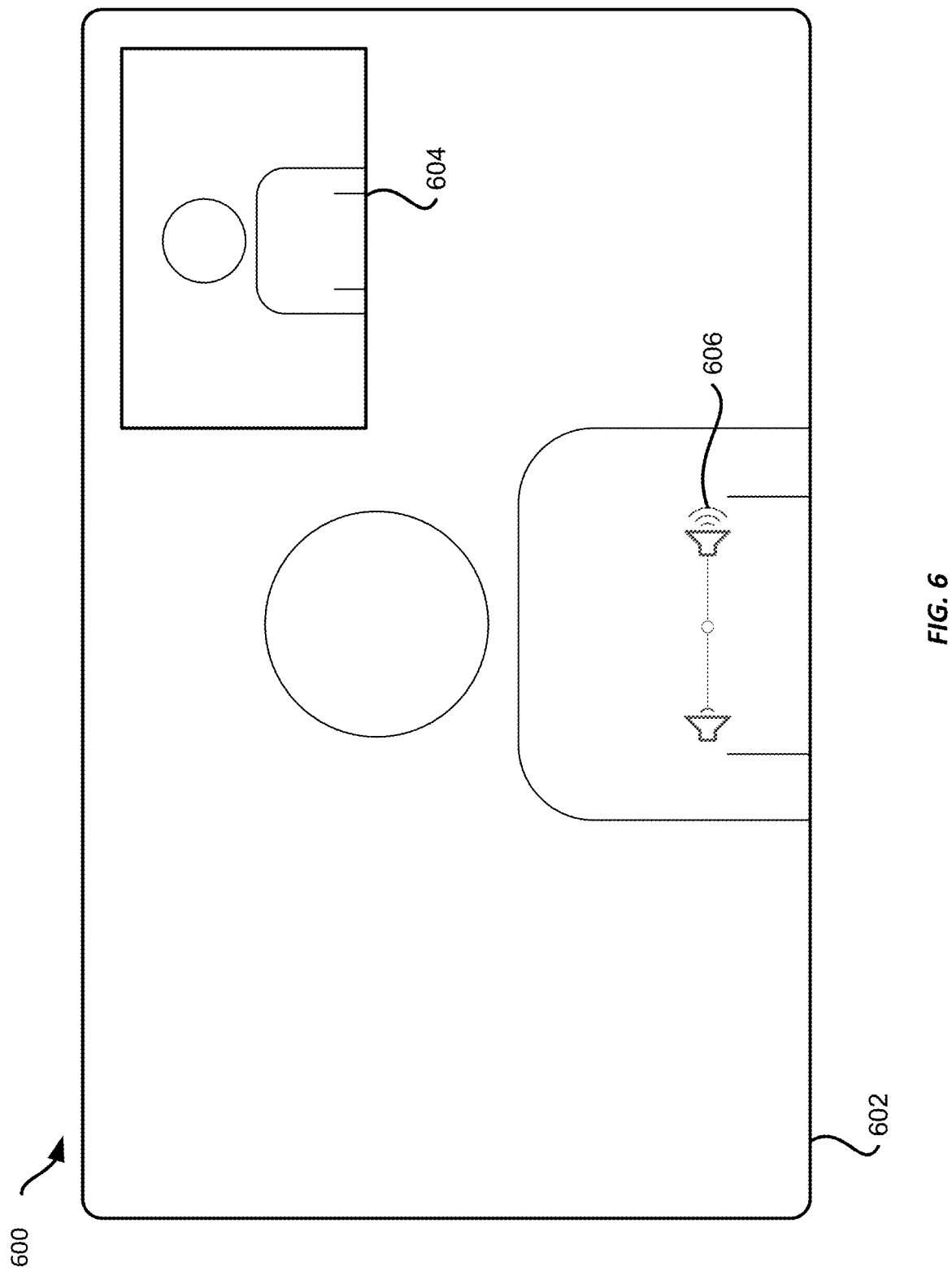
FIG. 6 shows an example of a user interface presented on a reception room meeting device in a reception area when the video meeting between the reception room meeting device and a receptionist device is established, according to certain aspects described herein.

FIG. 6 shows an example of a user interface 600 presented on a reception room meeting device 302 in a reception area 320 when the video meeting between the reception room meeting device 302 and a receptionist device 360 is established, according to certain aspects described herein. The user interface 600 includes a primary video display area 602 showing the video of the remote receptionist 362 and a secondary video display area 604 showing the video of the visitor 332. In the example shown in FIG. 6, the secondary video display area 604 is overlaid on the primary video display area 602. In some examples, the reception room meeting device 302 or the video conference provider 210 is configured to determine the location and size of the secondary video display area 604 so that it does not block or overlap with the face of the remote receptionist shown in the primary video display area 602. For instance, the reception room meeting device 302 or the video conference provider 210 performs face detection on the video of the remote receptionist to detect the face region. The reception room meeting device 302 or the video conference provider 210 further determines the location of the secondary video display area 604 so that it does not block or occlude the face region of the remote receptionist video when overlaid on top of the remote receptionist video.

If changing the location of the secondary video display area 604 alone is insufficient to avoid occlusion, the reception room meeting device 302 or the video conference provider 210 may further adjust the size of the secondary video display area 604 to avoid the occlusion. In some examples, the size of the secondary video display area 604 is maintained to be no smaller than a minimum size. If needed, the reception room meeting device 302 or the video conference provider 210 may also be configured to send a notification to the receptionist device 360 to request the remote receptionist to adjust his/her gesture so that the secondary video display area 604 can be properly displayed in the user interface 600 (e.g., does not overlap with the face region of the remote receptionist video, is maintained above a minimum size, is placed at a specific location, etc.).

In addition to the video of the remote receptionist and the visitor, the user interface shown on the reception room meeting device 302 is configured to include a minimal set of user interface controls that are necessary to the video meeting to avoid distraction. For example, the user interface 600 shown in FIG. 6 only includes a volume control 606 that allows the visitor 332 to adjust the audio volume of the meeting. In other configurations, the user interface may include a user interface control to allow the visitor 332 to select preferred language or other meeting preferences.

It should be understood that although the examples shown above focus on video meetings between the reception room meeting device 302 and the receptionist device 360 associated with the remote receptionist 362, the communication between the reception room meeting device 302 and the receptionist device 360 can also be an audio connection, such as an audio phone call. In this example, the video conference provider 210, the virtual receptionist system 350 or another system facilitates the audio connection between the reception room meeting device 302 and the receptionist device 360 associated with the remote receptionist 362 in a way similar to those described above for the video meetings.

In additional examples, the remote receptionist selected for the visitor 332 could route the visitor to another individual (e.g., another virtual receptionist). For example, after talking to the visitor 332 through the established connection (video meeting or audio call), the selected remote receptionist can have the reception room meeting device 302 connect to the device associated with another individual who can further assist the visitor 332, such as another receptionist device 360 associated with another remote receptionist. This can be achieved by, for example, the receptionist device 360 associated with the first remote receptionist sending a request to the video conference provider 210 or the virtual receptionist system 350 with the information of the individual identified by the first remote receptionist. The video conference provider 210 or the virtual receptionist system 350 then connects the reception room meeting device 302 to the device associated with the identified individual through a video meeting or an audio connection.

Figure 7:
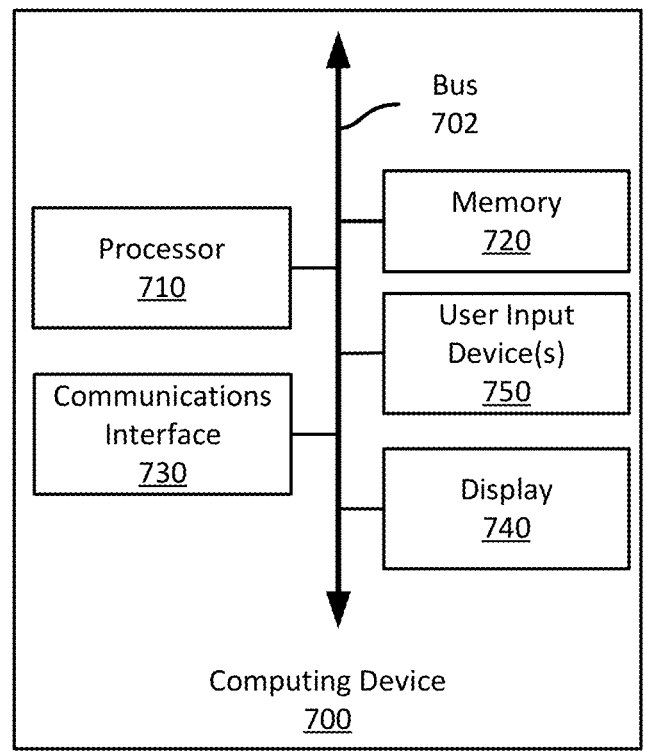
FIG. 7 shows an example computing device suitable for implementing aspects of the techniques and technologies described herein.

Referring now to FIG. 7, FIG. 7 shows an example computing device 700 suitable for implementing aspects of the techniques and technologies described herein. The example computing device 700 includes a processor 710 which is in communication with the memory 720 and other components of the computing device 700 using one or more communications buses 702. The processor 710 is configured to execute processor-executable instructions stored in the memory 720 to execute the reception room meeting device 302, the virtual receptionist system 350, the video conference provider 210, or a portion thereof according to this disclosure or to perform one or more methods for facilitating the check-in process of a visitor by a remote receptionist according to different examples, such as part or all of the example processes 400 and 500 described above with respect to FIGS. 4 and 5. The computing device, in this example, also includes one or more user input devices 750, such as a keyboard, mouse, touchscreen, video capture device, microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A computer-implemented method in which one or more processing devices perform operations comprising:
receiving, by a video conference provider from a reception room meeting device, a request for a meeting with a remote receptionist through the reception room meeting device, wherein the request is generated by the reception room meeting device, wherein the request comprises request data specifying a list of candidate remote receptionists identified without intervention from a visitor in an area where the reception room meeting device is located and comprising an indication of a preference setting for the meeting;
determining, by the video conference provider, one or more qualified remote receptionists from the list of candidate remote receptionists;
sending, by the video conference provider, a meeting request to a device associated with a first qualified remote receptionist that is available for the meeting; and
establishing, by the video conference provider and in response to the qualified remote receptionist accepting the meeting request, a video conference between the reception room meeting device and the device associated with the first qualified remote receptionist.

2. The computer-implemented method of claim 1, wherein the indication of the preference setting for the meeting comprises an indication generated based on a characteristic of a user triggering the request for the meeting, the characteristic comprising language used by the user, hearing impairment, or visual impairment of the user.

3. A system comprising:
a reception room meeting device configured for establishing a video conference with a device associated with a remote receptionist through the reception room meeting device by
sending, to a video conference provider, a meeting request for a video meeting with one of a list of candidate remote receptionists in response to receiving an activation signal triggered by a visitor in an area where the reception room meeting device is located, wherein the meeting request is generated by the reception room meeting device, and wherein the meeting request comprises request data specifying the list of candidate remote receptionists identified without intervention from the visitor; and
establishing the video meeting with a device associated with a remote receptionist available to assist the visitor out of the list of candidate remote receptionists selected by the video conference provider based on the meeting request;
one or more input devices configured for obtaining data associated with the visitor; and
one or more computing devices comprising one or more processors and non-transitory computer-readable media communicatively coupled to the one or more processors and storing processor-executable instructions that, when executed by the one or more processors, cause the one or more processors to:
access the data associated with the visitor obtained by the one or more input devices;
determine a status of the visitor based on the data associated with the visitor, the status of the visitor comprising an authenticity status or a physical status; and
transmit the status of the visitor to the device associated with the available remote receptionist.

4. The system of claim 3, wherein the request data further comprise an indication of a preferred language for the video meeting.

5. The system of claim 4, wherein the indication of a preferred language for the video meeting is generated based on audio data sampled by a microphone or an input provided by the visitor.

6. The system of claim 5, wherein generating the indication of a preferred language based on audio data sampled by the microphone comprises analyzing the audio data to detect a language used in the audio data or analyzing the audio data to detect a voice command in the audio data.

7. The system of claim 3, wherein the one or more input devices comprise a scanner, a chip reader, a temperature sensor, or an image sensor.

8. The system of claim 3, further comprises:
one or more output devices configured for generating documents for the visitor, wherein the one or more computing devices are further configured to, in response to receiving an instruction from the device associated with the remote receptionist, cause one of the output devices to generate a document for the visitor.

9. The system of claim 8, wherein the one or more output devices comprise a badge printer, a parking ticket printer, or a general printer.

10. The system of claim 3, wherein the one or more computing devices are further configured to:
   determine a room status of a room the visitor is scheduled to visit; and
   transmit the room status to the device associated with the remote receptionist.

11. The system of claim 3, further comprising a display, wherein the one or more computing devices are further configured to:
   receive a command from the device associated with the remote receptionist; and
   cause digital content to be presented on the display based on the command.

12. The system of claim 11, wherein the display is integrated into the reception room meeting device.

13. A system comprising:
   a reception room meeting device configured for establishing a video conference with a device associated with a remote receptionist through the reception room meeting device by
      sending a meeting request for a video meeting with one of a list of candidate remote receptionists in response to receiving an activation signal triggered by a visitor in an area where the reception room meeting device is located, wherein the request is generated by the reception room meeting device, and wherein the meeting request comprises request data specifying the list of candidate remote receptionists identified without intervention from the visitor; and
      establishing the video meeting with a device associated with a remote receptionist on the list of candidate remote receptionists selected based on the request;
   one or more computing devices comprising one or more processors and non-transitory computer-readable media communicatively coupled to the one or more processors and storing processor-executable instructions that, when executed by the one or more processors, cause the one or more processors to perform operations comprising:
      receiving, from the reception room meeting device among a plurality of reception room meeting devices, the request for the video meeting;
      determining a qualified remote receptionist from the list of candidate remote receptionists; and
      causing a video meeting between the reception room meeting device and a device associated with the qualified remote receptionist to be initiated by sending, to a video conference provider, a meeting request for the video meeting.

14. The system of claim 13, wherein the plurality of reception room meeting devices are located in respective geographical locations, and wherein a number of the plurality of reception room meeting devices is greater than a number of the list of candidate remote receptionists.

15. The system of claim 14, wherein the request data associated with the request from the reception room meeting device comprises an indication of a preferred language for the video meeting, and wherein determining the qualified remote receptionist further comprises selecting the qualified remote receptionist who speaks the preferred language.

16. The system of claim 15, wherein the indication of a preferred language for the video meeting is generated based on audio data sampled by a microphone of the reception room meeting device or an input provided by the visitor.

17. The system of claim 13, wherein the reception room meeting device generates the request in response to receiving a signal triggered by the visitor.

18. The system of claim 17, wherein the operations further comprise
   accessing data associated with the visitor that is obtained by input devices located in the area;
   determining a status of the visitor based on the data associated with the visitor; and
   transmitting the status of the visitor to the device associated with the remote receptionist, prior to sending the meeting request for the video meeting to the video conference provider.

19. The system of claim 13, wherein the operations further comprise:
   receiving a command from the device associated with the remote receptionist; and
   causing one or more devices at a geographical location of the reception room meeting device to be activated based on the command.

20. The system of claim 19, wherein causing one or more devices at a geographical location of the reception room meeting device to be activated based on the command comprises one or more of:
   causing an output device to generate a document for the visitor;
   causing digital content to be presented on a display device based on the command; or
   causing a device associated with a host of the visitor to display a message indicating an arrival of the visitor.

* * * * *